(12) United States Patent
Nishikawa

(10) Patent No.: US 8,045,198 B2
(45) Date of Patent: Oct. 25, 2011

(54) SYSTEM AND METHOD FOR PROCESSING A CHANGE HISTORY OF A PDF FILE

(75) Inventor: Shigeru Nishikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1025 days.

(21) Appl. No.: 11/564,450

(22) Filed: Nov. 29, 2006

(65) Prior Publication Data

US 2007/0236717 A1 Oct. 11, 2007

(30) Foreign Application Priority Data

Apr. 11, 2006 (JP) ................................. 2006-108196

(51) Int. Cl.
*G06F 3/12* (2006.01)
(52) U.S. Cl. ...................................... 358/1.15; 715/277
(58) Field of Classification Search .................. 715/206, 715/255, 277; 705/14.72, 26; 358/1.15; 709/206
See application file for complete search history.

(56) References Cited

U.S. PATENT DOCUMENTS

| | | | | |
|---|---|---|---|---|
| 6,078,934 A | * | 6/2000 | Lahey et al. | 715/255 |
| 6,092,089 A | * | 7/2000 | Lahey et al. | 715/255 |
| 6,918,082 B1 | * | 7/2005 | Gross et al. | 715/206 |
| 2002/0002567 A1 | | 1/2002 | Kanie et al. | |
| 2002/0103717 A1 | * | 8/2002 | Swart et al. | 705/26 |
| 2002/0116399 A1 | * | 8/2002 | Camps et al. | 707/200 |
| 2003/0234948 A1 | * | 12/2003 | Sasaki | 358/1.15 |
| 2004/0230892 A1 | * | 11/2004 | Horton | 715/511 |
| 2005/0231758 A1 | * | 10/2005 | Reynolds | 358/1.15 |
| 2006/0075041 A1 | * | 4/2006 | Antonoff et al. | 709/206 |
| 2006/0259524 A1 | * | 11/2006 | Horton | 707/201 |
| 2007/0192671 A1 | * | 8/2007 | Rufener | 715/500 |
| 2010/0042503 A1 | * | 2/2010 | Farmer | 705/14.72 |

FOREIGN PATENT DOCUMENTS

| | | |
|---|---|---|
| JP | 7182319 A | 7/1995 |
| JP | 8147292 | 6/1996 |
| JP | 8166946 | 6/1996 |
| JP | 200224211 | 1/2002 |

OTHER PUBLICATIONS

Japanese Notice of Grounds for Rejection issued on Jun. 21, 2011 in connection with a corresponding Japanese Application No. 2006-108196 with excerpt English translation thereof.
Kizaki, Kentaro, Processing of Simple Workflow with PDF, Nikkei Digital Engineering, Japan, Nikkei Business Publication, 2002, Sep. 15, 2002, No. 58 (Oct. 2002 issue), pp. 36-37.

* cited by examiner

*Primary Examiner* — Twyler Haskins
*Assistant Examiner* — Nicholas Pachol
(74) *Attorney, Agent, or Firm* — Gesmer Updegrove LLP

(57) ABSTRACT

A printer includes a file input section that receives an input PDF file that holds change history; a change history extraction section that extracts the change history from the input PDF file; and a print processing section that prints the extracted change history.

14 Claims, 6 Drawing Sheets

CHANGE HISTORY LIST

FIRST PAGE: NO CHANGE HISTORY
SECOND PAGE: DELETE "PRODUCE"
              ADD "IS PRODUCED"
THIRD PAGE: NO CHANGE HISTORY
FORTH PAGE: NO CHANGE HISTORY
FIFTH PAGE: DELETE "FIG. 2"
              ADD "FIG. 3"

Fig. 3

SYSTEM AND METHOD FOR PROCESSING A CHANGE HISTORY OF A PDF FILE

PRIORITY INFORMATION

This application claims priority from Japanese Patent Application No. 2006-108196, filed on Apr. 11, 2006.

BACKGROUND

1. Technical Field

The present invention relates to a printer, a print data output device, a method, a computer readable medium, and a computer data signal.

2. Related Art

In relation to an electronic document, such as specifications, a manual, or the like, which is repeatedly modified/changed and to be distributed to a third party, the contents of a change from the previous version may be described for each version in the form of a history. In general, each version is given a unique file name and stored as a unique file.

Here, an electronic document such as specifications, a manual, or the like, as described above, is generally distributed with the main purpose of providing the latest version so that the user can refer to the content thereof. Therefore, many such documents are often distributed in a PDF (Portable Document Format) file; that is, a general purpose format depending on neither a platform nor an application.

SUMMARY

According to one aspect of the present invention, there is provided a printer, having: a file input section that receives an input PDF file that holds change history; a change history extraction section that extracts the change history from the input PDF file; and a print processing section that prints the extracted change history.

BRIEF DESCRIPTION OF THE DRAWINGS

Exemplary embodiments of the present invention will be described in detail based on the following figures, wherein:

FIG. 3 is a diagram showing an example of a summary of change history;

DETAILED DESCRIPTION

Below, an exemplary embodiment of the present invention will be described with reference to the accompanying drawings.

Figure 1:
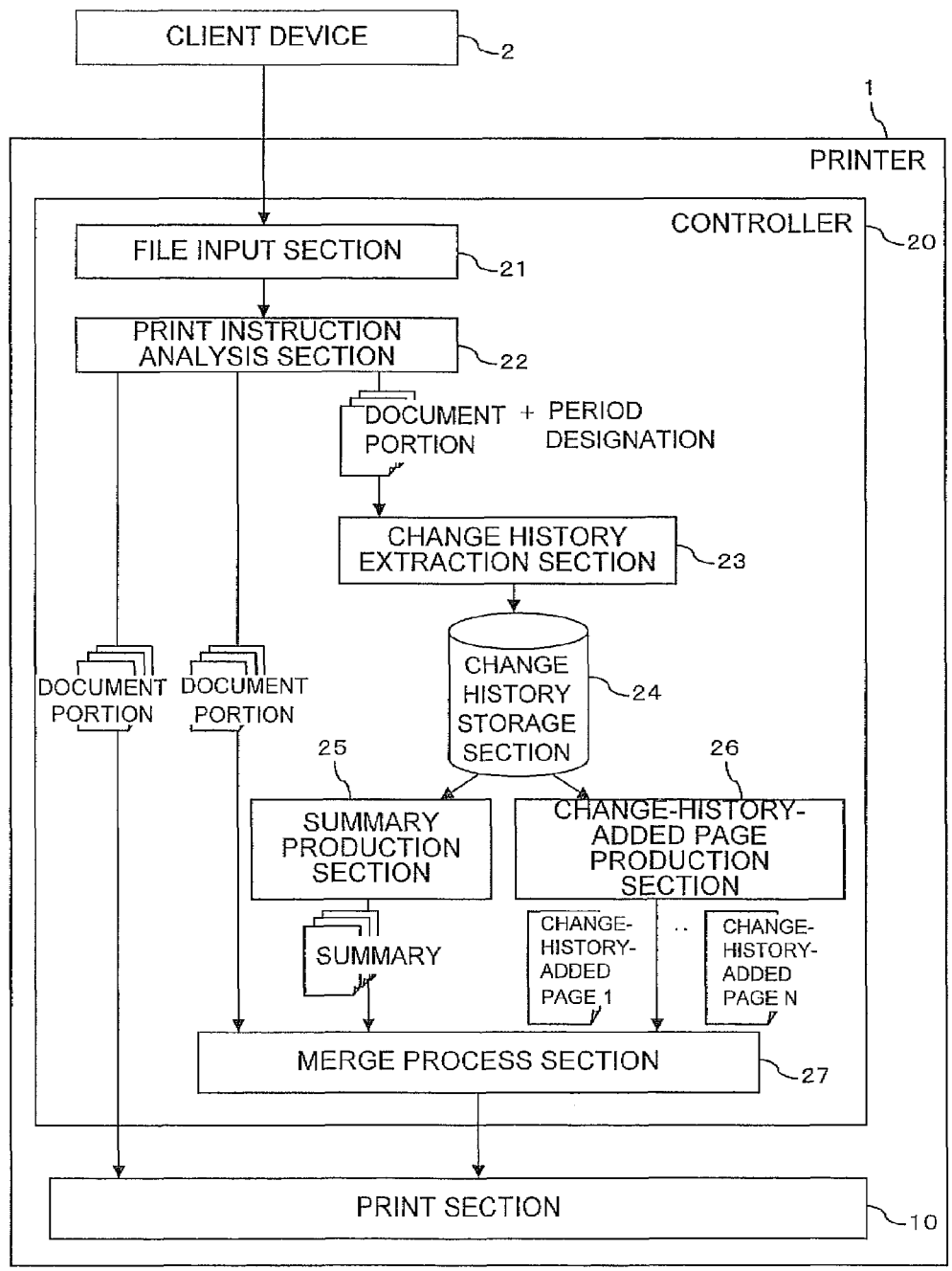
FIG. 1 is a block diagram showing the structure of a printer according to an exemplary embodiment.

FIG. 1 is a block diagram showing the structure of a printer 1 according to this exemplary embodiment. The printer 1 is a device for receiving a print job accompanied with a PDF file and for printing the PDF file. Specifically, the printer 1 has a function of receiving a print job containing a PDF file sent from a client device 2 such as a personal computer (PC) or the like, and for analyzing and printing the PDF file. That is, the printer 1 has a direct print function for a PDF file.

As described above, a PDF file holds change history. Specifically, a PDF file, concerning change of objects constituting the PDF file, holds the contents of the change and the time and date of the change. More specifically, a PDF file holds, in a list format, information on a position and current state of use (on/off) of each rendering object and the time of deletion of each rendering object from the concerned document, and the like. It should be noted that, as the above-described object, a text object, an image object, a page object, and so forth, can be mentioned.

As shown in FIG. 1, the printer 1 has a print section 10 and a controller 20.

The print section 10 is a device for printing an image onto a print medium such as paper, by means of a desired print method, such as an electro-photographic method, on the basis of a control instruction sent from the controller 20. That is, the print section 10 is an IOT (Image Output Terminal).

The controller 20 carries out overall control in relation to the printer 1. Specifically, the controller 20 receives a print job containing a PDF file, analyzes the PDF file, and causes the print section 10 to print and output the PDF file. In this exemplary embodiment, the controller 20 is a circuit board having a CPU (Central Processing Unit), ROM (Read Only Memory), a main memory, NVRAM (Non Volatile RAM), or the like, mounted thereon, and its function is realized by reading a program recorded in a recording medium such as the ROM or the like to the main memory and executing the read program by means of the CPU. Alternatively, the function of the controller 20 may be realized by means of a hardware circuit such as an ASIC (Application Specific Integrated Circuit), or the like.

The controller 20 has, as function blocks, a file input section 21, a print instruction analysis section 22, a change history extraction section 23, a change history storage section 24, a summary production section 25, a change-history-added page production section 26, and a merge process section 27.

The file input section 21 receives an input of a PDF file. In this exemplary embodiment, the file input section 21 receives from the client device 2 a print job containing a PDF file and print instruction information. The specific content of the print instruction information will be described in detail later.

The print instruction analysis section 22 analyzes the print instruction information received by the file input section 21, and sends an instruction based on the analyzed result to the change history extraction section 23, the summary production section 25, the change-history-added page production section 26, the merge process section 27, and the print section 10.

According to the instruction sent from the print instruction analysis section 22, the change history extraction section 23 extracts change history from the PDF file received by the file input section 21.

The change history storage section 24 temporarily stores the change history extracted by the change history extraction section 23.

The summary production section 25 produces a summary of the extracted change history in accordance with the instruction sent from the print instruction analysis section 22 and on the basis of the content stored in the change history storage section 24.

In accordance with the instruction sent from the print instruction analysis section 22 and on the basis of the content stored in the change history storage section 24, the change-history-added page production section 26 produces, for each page in the PDF file that contains the extracted change history, a change-history-added page on which relevant change history is shown in a visual manner.

In accordance with the instruction sent from the print instruction analysis section 22, the merge process section 27 produces a merged document by merging the summary of the change history, produced by the summary production section 25, and the document portion in the PDF file, or by merging the change-history-added page, produced by the change-history-added page production section 26, and the document portion in the PDF file, and causes the print section 10 to print the produced merged document.

Figure 2:
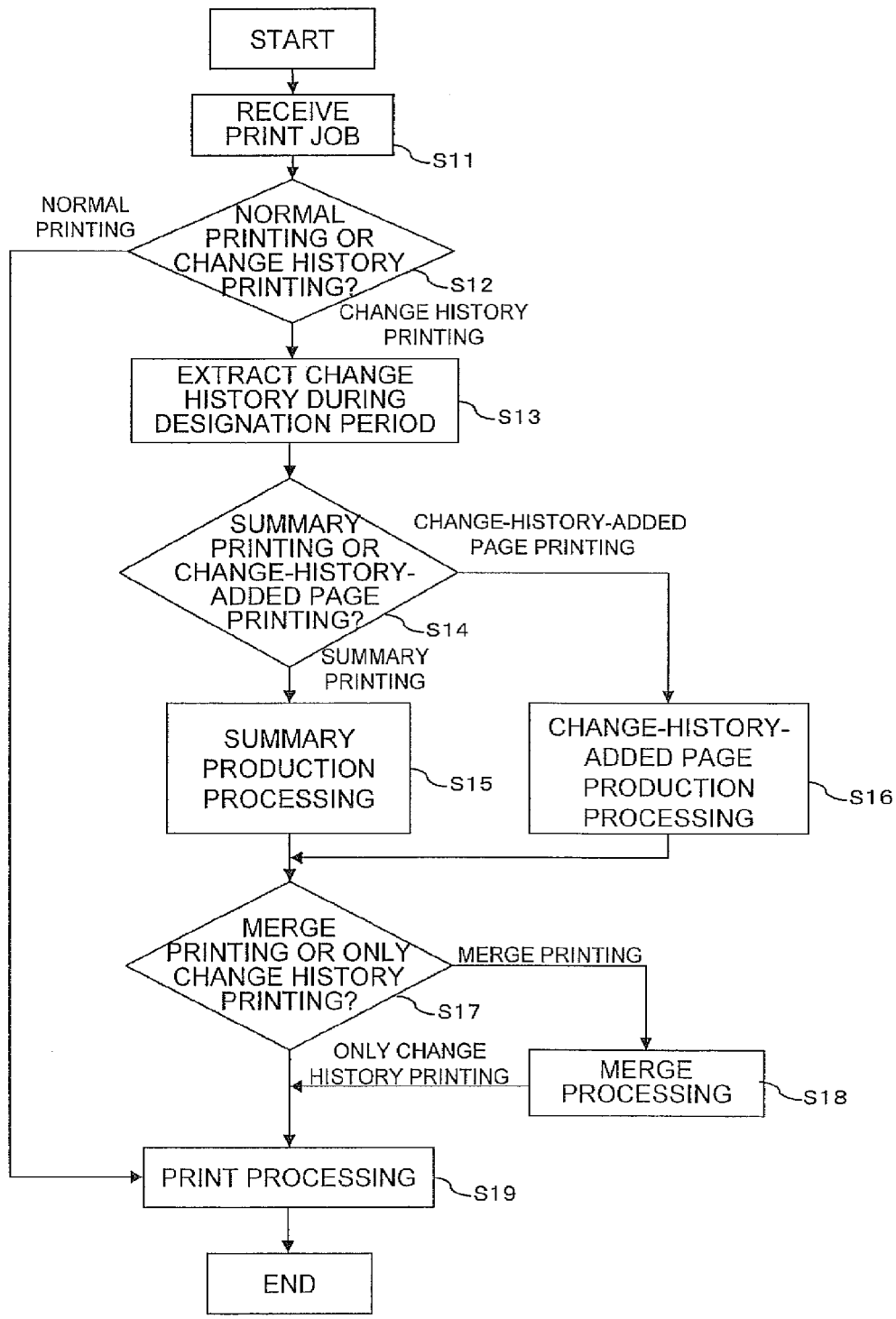
FIG. 2 is a flowchart showing an operation procedure of the printer according to the exemplary embodiment.

FIG. 2 is a flowchart of an operation procedure of the printer 1 according to this exemplary embodiment.

In the following, by reference to FIG. 2, an operation of the printer 1 will be specifically described.

The client device 2 receives from the user a designation of a PDF file to be printed and print instruction information, and sends a print job containing the designated PDF file and the print instruction information to the printer 1, either directly or via a server (not shown). This process is realized by, for example, a software program for direct printing, which is installed in the client device 2.

For example, on the desktop screen of the client device 2, the user of the client device 2 drags the icon of the PDF file to be printed onto the icon of the software for direct printing, and drops the same thereon. With this operation by the user, the client device 2 receives designation of the PDF file to be printed. Then, the client device 2 shows a print instruction input screen on the display screen and receives print instruction information input by the user on the print instruction input screen.

Here, it should be noted that the client device 2 receives, as print instruction information, a general print instruction, such as designation of the kind of print paper and the kind of finishing processing, or the like, and also instructions (a) through (d) described below.

(a) An instruction requesting execution of either normal or change history printing (hereinafter referred to as a "print method instruction").
(b) Designation of a period of time so that changes having occurred during the period are to be extracted as change history (hereinafter referred to as a "period designation").

As a designation of a period of time, designation of two versions, that of two time points, and so forth, may be used. More specifically, designation by specifying a version, such as a specific version and another specific version (for example, the first version and the latest version, the $8^{th}$ version and the $12^{th}$ version), or time, such as before/after a specific time and date, may be applicable. When an advance arrangement is made such that a version number is included in the file name or denoted on a jacket page of the PDF file, the user can ascertain the version of the PDF file by referring to the version number.
(c) An instruction requesting execution of either summary printing or printing of a page with change history shown thereon (hereinafter referred to as "summary/change-history-added page selection instruction").
(d) An instruction requesting execution of either merge printing or printing of only change history (hereinafter referred to as "merge/only change history selection instruction."

In FIG. 2, the file input section 21 of the printer 1 receives a print job containing a PDF file and print instruction information sent from the client device 2, and forwards the print job to the print instruction analysis section 22 (S11).

Having received the print job from the file input section 21, the print instruction analysis section 22 determines which of normal printing and the change history printing is instructed, by reference to the print method instruction contained in the print instruction information contained in the print job (S12).

When it is determined in step S12 that normal printing is instructed, the print instruction analysis section 22 produces print data of the document portion (for example, raster data) of the PDF file, and causes the print section 10 to print the print data (S19). That is, the printer 1 prints and outputs the PDF file in a normal manner.

On the other hand, when it is determined in step S12 that change history printing is instructed, change history printing processing (S13 through S19) to be described below is carried out.

Specifically, in the change history printing process, the print instruction analysis section 22 forwards to the change history extraction section 23 the PDF file and the period designation, both of which are contained in the print instruction information.

Having received the PDF file and the period designation from the print instruction analysis section 22, the change history extraction section 23 analyzes the received PDF file, extracts change history relevant to the designated period (for example, a period between the designated versions) to produce change history data, and stores the produced change history data in the change history storage section 24 (S13). It should be noted that in the case where no change history is extracted, the change history extraction section 23 stores information describing "no change history" in the change history storage section 24 as change history data.

Thereafter, the print instruction analysis section 22 determines which of summary printing and change-history-added page printing is instructed, by reference to the summary/change-history-added page selection instruction contained in the print instruction information (S14).

When it is determined in step S14 that summary printing is instructed, the print instruction analysis section 22 instructs the summary production section 25 to produce a summary. Having received the instruction, the summary production section 25 produces the summary of the extracted change history by reference to the change history data stored in the change history storage section 24 (S15). Then, the summary production section 25 forwards the produced summary to the merge process section 27.

As one example of the summary production, the summary production section 25 produces a summary showing, in a list format, change history concerning each page, as shown in FIG. 3. It should be noted that, although in the example shown in FIG. 3 the change history concerning all pages is shown on a single page, the change history concerning all pages may be shown over multiple pages, depending on the amount thereof.

Meanwhile, when it is determined in step S14 that printing of the change-history-added page is instructed, the print instruction analysis section 22 instructs the change-history-added page production section 26 to produce a change-history-added page. Having received the instruction, the change-history-added page production section 26 produces, for each page in the PDF file that contains the extracted change history, a change-history-added page on which the concerned change history is shown in a visual manner, on the basis of the change history data stored in the change history storage section 24 (S16). Then, the change-history-added page production section 26 forwards the produced change-history-added page to the merge process section 27.

Figure 4:
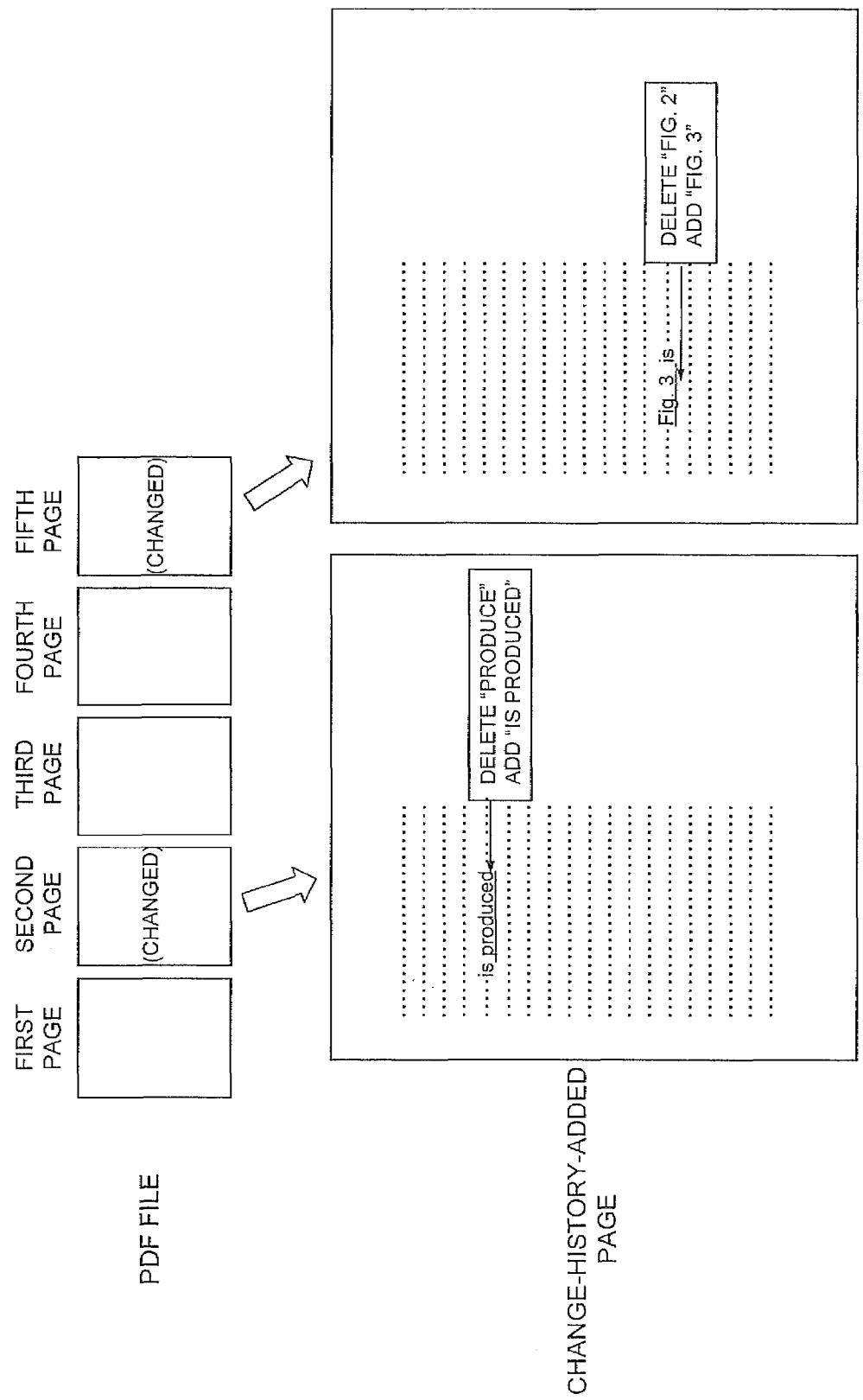
FIG. 4 is a diagram showing an example of a change-history-added page.

One example of the production of the above-described change-history-added page will be described. Suppose that the second and fifth pages among five total pages of the PDF file have change history. The change-history-added page production section 26 produces change-history-added pages in relation to the second and fifth pages, respectively, as shown in FIG. 4. On each of the change-history-added pages shown in FIG. 4, information on the concerned change history is shown as an addition to the main part of the page.

Specifically, the content of change is described in the margin of the page such that the description is associated with the relevant changed portion in the main part via a drawn line. It should be noted that, obviously, the manner of visualization of the change history is not limited to the above-described embodiment. It should also be noted that, in view that production of a change-history-added page requires the document portion of a PDF file, the change-history-added page production section 26 receives the document portion from the print instruction analysis section 22, for example.

Thereafter, the print instruction analysis section 22 determines which of merge printing and only change history printing is instructed, by reference to the merge/only change history selection instruction contained in the print instruction information (S17).

When it is determined in step S17 that merge printing is instructed, the print instruction analysis section 22 instructs the merge process section 27 to carry out merge printing. Having received the instruction, the merge process section 27 merges the document portion of the PDF file and either the summary received from the summary production section 25 and the change-history-added page received from the change-history-added page production section 26, to thereby produce a single complete document file (S18).

Figure 5:
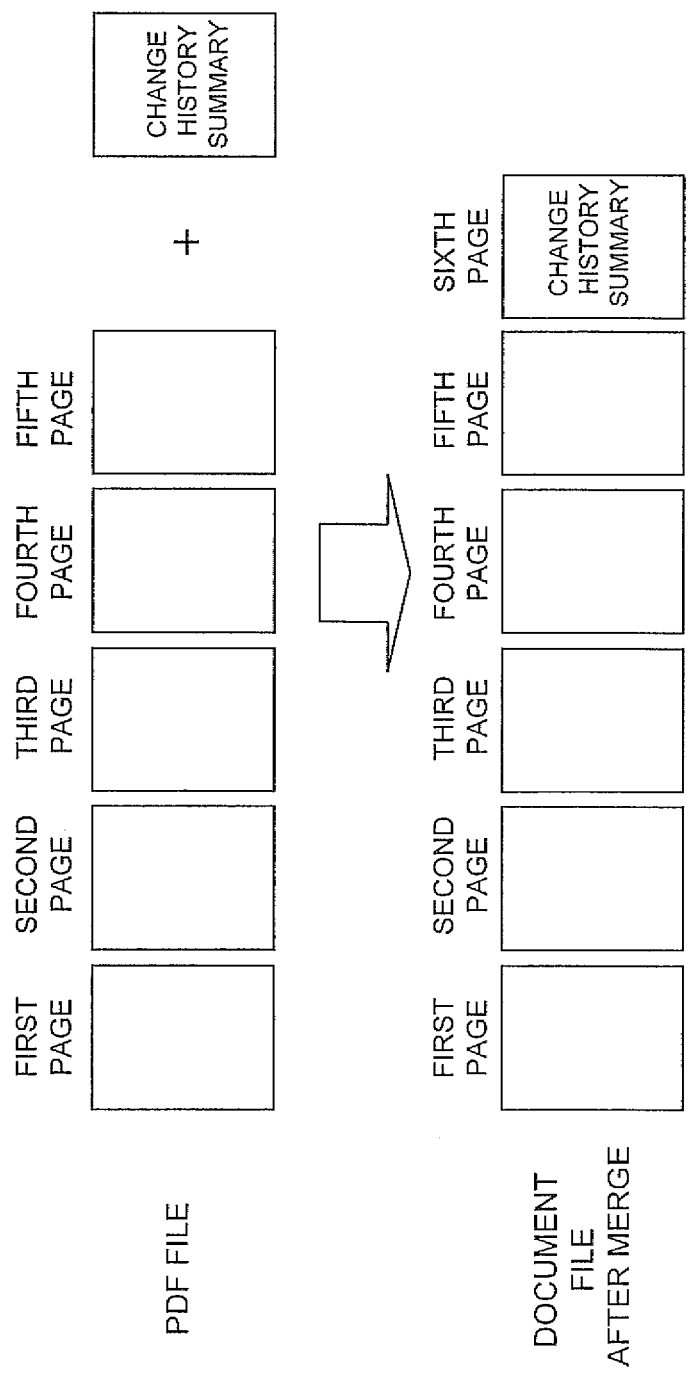
FIG. 5 is a diagram showing an example of merge processing in summary printing.

Specifically, in summary printing, the merge process section 27 adds the summary to the beginning or end of the document portion to thereby produce a single complete document file. FIG. 5 shows an example of merge processing to be carried out in summary printing. In FIG. 5, the summary having one page is added to the end of the document portion having five total pages, whereby a document file having six total pages is produced. It should be noted that designation of the position to which the summary is added may be contained in the print instruction information as designated by the user, for example, or the position may be determined in advance in the printer 1.

Meanwhile, in change-history-added page printing the merge process section 27 exchanges a page having change history and a corresponding page contained in the document portion, to thereby produce a single complete document file. In other words, the merge process section 27 merges the original page of the document portion, which does not have a corresponding change-history-added page, and a change-history-added page, to thereby produce a single complete document file.

Figure 6:
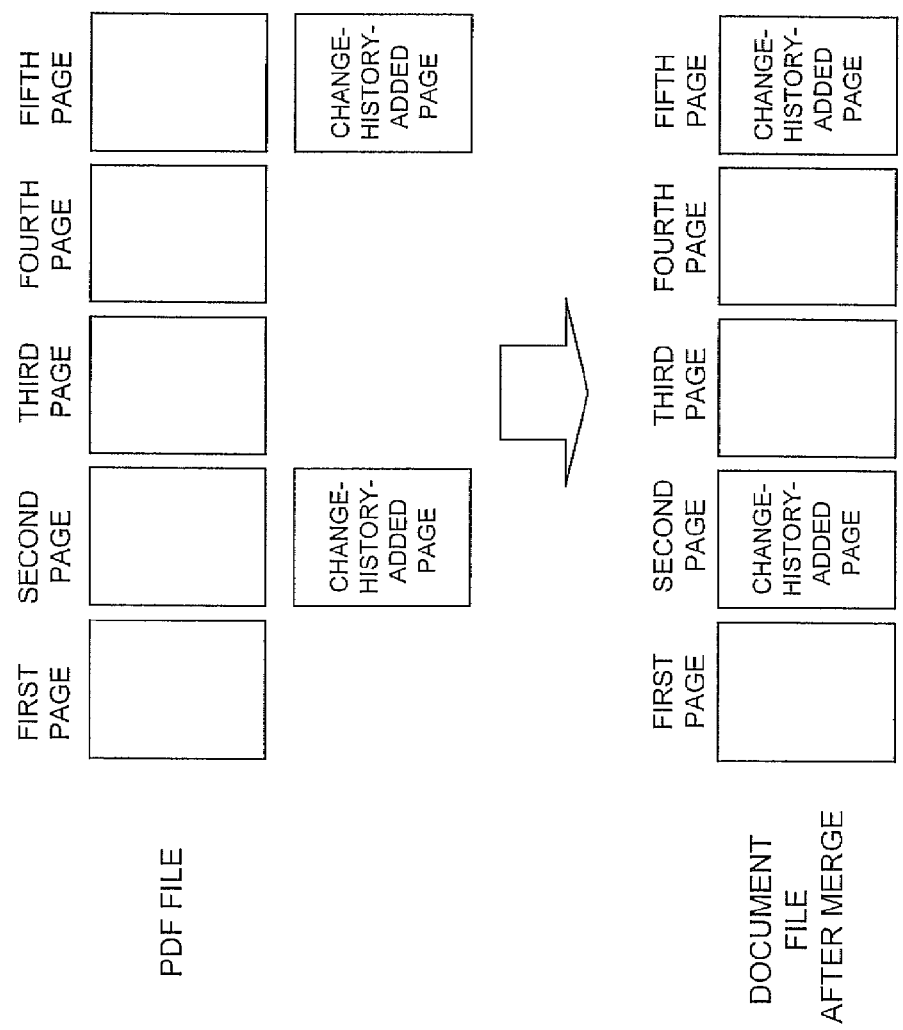
FIG. 6 is a diagram showing an example of merge processing in printing a change-history-added page.

FIG. 6 shows one example of merge processing to be carried out in printing a change-history-added page. In FIG. 6, the second and fifth pages of the document portion having five total pages are exchanged with the corresponding change-history-added pages, so that a document file having five total pages is produced.

Thereafter, the merge process section 27 produces print data of the document file produced in step S18 described above, and causes the print section 10 to print the print data (S19). That is, in summary printing, the printer 1 prints and outputs a document formed by merging the summary of the change history and the document portion, as shown in FIG. 5. Meanwhile, in change-history-added page printing the printer 1 prints and outputs a document formed by merging the change-history-added page and the document portion, as shown in FIG. 6.

When it is determined in step S17 that only change history printing is instructed, the print instruction analysis section 22 instructs the merge process section 27 to carry out only change history printing. Having received the instruction, the merge process section 27 produces print data of the summary received from the summary production section 25 or print data of the change-history-added page received from the change-history-added page production section 26, and causes the print section 10 to print the print data (S19). That is, in summary printing, the printer 1 prints and outputs the summary as shown in FIG. 3. In change-history-added page printing, on the other hand, the printer 1 prints and outputs the change-history-added page as shown in FIG. 4.

Here, it should be noted that, in relation to a PDF file, the overall page structure of the document portion may be changed (such as addition, deletion, exchange of a page, and so forth) in addition to the content of each page. Therefore, in summary printing, the printer 1 preferably produces and prints a summary of the change history concerning the content of each page and the page structure of the entire document. In change-history-added page printing, on the other hand, the printer 1 preferably prints a summary of the change history concerning the page structure of the entire document, in addition to the change-history-added page.

Further, when the page addition and/or deletion is taken into consideration, it is preferable, in extraction of the content of change concerning each page, to compare page objects having identical page IDs, which do not depend on page order, rather than to compare page objects having identical page numbers (page order). Here, a page ID is identification information for uniquely identifying a page object.

It should be noted that, although in the above description the file input section 21 receives a PDF file itself, the file input section 21 may alternatively receive a designation of a PDF file by means of ID information, such as an address or the like, on the PDF file so as to read the designated PDF file from the memory device. In this case, the file input section 21 receives a designation of a PDF file from the user via, for example, the operational panel of the printer 1 and/or the client device 2.

As the above-described memory device where a PDF file for printing is stored, there can be mentioned a portable recording medium, such as a flash memory card, or the like, removably mounted to the printer 1; a memory device, such as a hard disk, or the like, in the printer 1; a memory device on a network; or the like.

It should also be noted that, although in the above-described example the printer 1 receives print instruction information from the client device 2, alternatively, the printer 1 may receive print instruction information via the operational panel of the printer 1.

It should also be noted that, although in the above example the printer 1 receives print instruction information at the time of printing, alternatively, the printer 1 may receive print instruction information in advance (before printing) and hold the same. In this case, the printer 1 receives print instruction information from, for example, the client device 2 via a network or from the operational panel. In this case, the printer 1 may receive only a PDF file for printing at the time of printing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with various modifications as are suited to the particular use contemplated. It is intended that the scope of the invention be defined by the following claims and their equivalents.

For example, the above-described function for producing and outputting print data for change history printing; that is, the function similar to the function blocks 21 through 27, may be realized by means of the client device 2. In this case, the printer driver in the client device 2, for example, receives a PDF file, extracts change history from the PDF file, and outputs the change history as print data (for example, PDL data) to the printer 1.

Specifically, in accordance with an instruction sent from the user, the printer driver in the client device 2 outputs to the printer 1 the print data of a summary, that of a change-history-added page, that of a document formed by merging the summary and the document portion, or that of a document formed by merging the change-history-added page and the document portion.

The above-described printer 1 may have a function for printing a specific version in response to the user's designation. Specifically, the printer 1 receives an input of a PDF file and a designation of the version to be printed, produces the designated version of the PDF file based on the change history held in that PDF file, and prints the version. Here, the version designation may be contained in the above described print instruction information, for example.

It should be noted that the function for producing and outputting the print data on a specific version may be realized by means of the controller 20, similar to the case of the above-described change history print, or the printer driver or the like of the client device 2.

What is claimed is:

1. A printer, comprising:
   a file input section that receives an input PDF file and print instruction information, the input PDF file containing a change history of edits to the input PDF file;
   a change history extraction section that extracts a change history from the input PDF file; and
   a print processing section that prints the extracted change history;
   said print instruction information including period designation information which designates a period of time for the PDF file, and summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized;
   said change history extraction section extract in the change history from the input PDF file corresponding to the period designation information;
   said print processing section executing the summary printing process or the change-history-added page printing process according to an instruction indicated by the print instruction information.

2. The printer according to claim 1, wherein said print instruction information contains merge instruction information which instructs whether a merge printing process is to be executed, the merge printing process being a process in which the summary and a document portion of the PDF file are merged and printed when the summary/change-history-added page selection instruction information instructs execution of the summary printing process and a page on which the change history is visualized in the PDF file and other pages in the PDF file are merged and printed when the summary/change-history-added page selection instruction information instructs execution of the change-history—added page printing process;
   said print processing section executing the merge printing process when the merge instruction information indicates that the merge printing process is to be executed.

3. The printer according to claim 1, wherein the print instruction information includes single print instruction information which instructs whether a change history single printing process is to be executed, the change history single printing process being a process in which the summary is printed independently from a document portion of the PDF file when the summary/change-history-added page selection instruction information instructs execution of the summary printing process and a page on which the change history is visualized in the PDF file is printed independently from other pages in the PDF file when the summary/change-history-added page selection instruction information instructs execution of the change-history-added page printing process;
   said print processing section executing the change history single printing process when the single print instruction information indicates that the change history single printing process is to be executed.

4. The printer according to claim 1, wherein the period designation information designates a period of time between designated versions of the input PDF file.

5. The printer according to claim 4, wherein the period designation information designates a period of time between designated time points of the input PDF file.

6. A printer, comprising:
   a file input section that receives an input PDF file and print instruction information, the input PDF file containing a change history of edits to the input PDF file;
   a version designation receiving section that receives a designation of a version of the input PDF file to be printed; and
   a print processing section that produces the version of the input PDF file to be printed from the received input PDF file, on the basis of the change history corresponding to the received version designation, and prints the produced version of the input PDF file to be printed;
   said print instruction information including summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized;
   said print processing section executing the summary printing process or the change-history-added page printing process according to an instruction indicated by the print instruction information.

7. A print data output device, comprising:
   a file input section that receives an input PDF file and print instruction information, input PDF file containing a change history of edits to the input PDF file;
   a change history extraction section that extracts a change history from the input PDF file; and
   a print data output section that outputs the extracted change history as print data;
   said print instruction information including period designation information which designates a period of time for the PDF file, and summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized;

said change history extraction section extracting the change history from the input PDF file corresponding to the period designation information;

said print processing section executing the summary printing process or the change-history-added page printing process according to an instruction indicated by the print instruction information.

8. A print data output device, comprising:

a file input section that receives an input PDF file and print instruction information, the input PDF file containing a change history of edits to the input PDF file;

a version designation receiving section that receives a designation of a version of the input PDF file to be printed; and a print processing section that produces the version of the input PDF file to be printed from the received input PDF file, on the basis of the change history corresponding to the received version designation, and prints the produced version of the input PDF file to be printed as print data;

said print instruction information including summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized;

said print processing section executing the summary printing process or the change-history-added page printing process according to an instruction indicated by the print instruction information.

9. A method for printing change history of a PDF file, comprising:

receiving an input PDF file and print instruction information, time, the input PDF file containing a change history of edits to the input PDF file;

extracting a change history from the input PDF file; and printing, using a printer, the extracted change history, the print instruction information including period designation information which designates a period of time for the PDF file, and summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized, extracting the change history from the input PDF file corresponding to the period designation information; and executing the summary printing process or the change-history-added page printing process according to an instruction indicated by the print instruction information.

10. A method for printing a PDF file, comprising:

receiving an input PDF file and print instruction information, the input PDF file containing a change history of edits to the input PDF file;

receiving a designation of a version of the input PDF file to be printed;

producing the version of the input PDF file to be printed from the received input PDF file, on the basis of the change history corresponding to the received version designation; and printing, using a printer, the produced version of the input PDF file to be printed, the print instruction information including summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized; and executing the summary printing process or the change-history-added page printing process according to an instruction indicated by the print instruction information.

11. A non-transitory computer readable medium storing a program causing a computer to execute a process for printing change history of a PDF file, the process comprising:

receiving an input PDF file and print instruction information, the input PDF file containing a change history of edits to the input PDF file;

extracting a change history from the input PDF file; and printing, using a printer, the extracted change history, the print instruction information including period designation information which designates a period of time for the PDF file, and summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized;

extracting the change history from the input PDF file corresponding to the period designation information; and executing the summary printing process or the change-history-added page printing process according to an instruction indicated by the print instruction information.

12. A non-transitory computer readable medium storing a program causing a computer to execute a process for printing a PDF file, the process comprising:

receiving an input PDF file and print instruction information, the input PDF file containing a change history of edits to the input PDF file;

receiving a designation of a version of the input PDF file to be printed;

producing the version of the input PDF file to be printed from the received input PDF file, on the basis of the change history corresponding to the received version designation; and printing, using a printer, the produced version of the input PDF file to be printed, the print instruction information including summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized; and executing the summary printing process or the change-history-added page printing process according to an instruction indicated by the print instruction information.

13. A non-transitory computer readable medium storing a program causing a computer to execute a process for outputting print data, the process comprising:

receiving an input PDF file and print instruction information, the input PDF file containing a change history of edits to the input PDF file;

extracting a change history from the input PDF file; and outputting the extracted change history as print data, the print instruction information including period designation information which designates a period of time for the PDF file, and summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized;

extracting the change history from the input PDF file corresponding to the period designation information; and executing the summary printing process or the change-history-added page printing process according to an instruction indicated by the print instruction information.

14. A non-transitory computer readable medium storing a program causing a computer to execute a process for outputting print data, the process comprising:

receiving an input PDF file and print instruction information, the input PDF file containing a change history of edits to the input PDF file;

receiving a designation of a version of the input PDF file to be printed;

producing the version of the input PDF file to be printed from the received input PDF file, on the basis of the change history corresponding to the received version designation; and outputting the produced version of the input PDF file to be printed as print data, the print instruction information including summary/change-history-added page selection instruction information which instructs which printing process from a group of printing processes is to be executed, said group of printing processes including a summary printing process in which a summary of the extracted change history is printed and a change-history-added page printing process in which a page in the PDF file, which contains the extracted change history, is printed such that the change history is visualized; and executing the summary printing process or the change-history-added page printing process according to an instruction indicated by the print instruction information.

* * * * *